US007249235B2

(12) United States Patent
Sexton et al.

(10) Patent No.: US 7,249,235 B2
(45) Date of Patent: Jul. 24, 2007

(54) ARCHITECTURE FOR A SCALABLE AND USER-EXTENSIBLE HEAP DUMP ANALYSIS TOOL

(75) Inventors: Harlan Sexton, Palo Alto, CA (US); Robert Lee, Sunnyvale, CA (US); Peter Benson, Missoula, MT (US)

(73) Assignee: Oracle International Corporation, Redwood Shores, CA (US)

( * ) Notice: Subject to any disclaimer, the term of this patent is extended or adjusted under 35 U.S.C. 154(b) by 522 days.

(21) Appl. No.: 10/872,536

(22) Filed: Jun. 21, 2004

(65) Prior Publication Data

US 2005/0283585 A1 Dec. 22, 2005

(51) Int. Cl.
*G06F 12/00* (2006.01)
(52) U.S. Cl. .................. 711/165; 711/100; 711/101; 711/165; 711/166; 711/170; 711/171; 711/173; 707/200; 707/205; 707/206
(58) Field of Classification Search ........ 711/165–166, 711/170–171
See application file for complete search history.

(56) References Cited

U.S. PATENT DOCUMENTS

| 5,751,613 | A  | * | 5/1998  | Doty et al. ............... 703/2 |
| 6,351,794 | B1 | * | 2/2002  | Spilo et al. ............. 711/173 |
| 6,564,223 | B1 |   | 5/2003  | Sexton et al. |
| 6,625,808 | B1 | * | 9/2003  | Tarditi ..................... 717/154 |
| 2003/0212719 | A1 | * | 11/2003 | Yasuda et al. .......... 707/206 |
| 2004/0181562 | A1 | * | 9/2004  | Findeisen ............... 707/206 |
| 2005/0033781 | A1 | * | 2/2005  | Dussud .................... 707/206 |

OTHER PUBLICATIONS

Foote, Bill, "HAT-The Java Heap Analysis Tool," java.net, retrieved from the internet at <https://hat.dev.java.net/doc/README.html>, retrieved on Nov. 7, 2005, 4 pages.
Livshits, Benjamin, "Finding Memory Leaks in Java with JDeveloper," Computer Science Department, Stanford University, retrieved from the internet at <http://suif.stanford.edu/~livshits/papers/pdf/mem.pdf>, 6 pages.
O'Hair, Kelly, "HPROF: A Heap/CPU Profiling Tool J2SE 5.0," Sun Developer Network, Nov. 18, 2004, retrieved from the internet at >http://java.sun.com/developer/technicalArticles/Programming/HPROF.html>, retrieved on Nov. 7, 2005, 7 pages.
Shirazi, Jack, "Tool Report: JProfiler," Java Performance Tuning, Jun. 2002, retrieved from the internet at <http://javaperformancetuning.com/tools/jprofiler/index.shtml>, retrieved on Nov. 7, 2005, 6 pages.

* cited by examiner

*Primary Examiner*—Sanjiv Shah
*Assistant Examiner*—Zhuo H. Li
(74) *Attorney, Agent, or Firm*—Hickman Palermo Truong & Becker LLP

(57) ABSTRACT

A heap analyzer that processes a snapshot of the heap contained in a dump file is described. The heap analyzer tool can be configured to relocate the pointers in the dumped heap and allow developers to examine the heap in web browser by presenting markup for displaying a heap object in the browser and rendering pointers in the object as clickable links. When a link is selected, the pointer is followed to another object and markup is generated for rendering that object with its links. Furthermore, callbacks may be provided through an application programming interface (API) to allow developers to furnish their own code for analyzing and displaying their data structures.

24 Claims, 7 Drawing Sheets

ARCHITECTURE FOR A SCALABLE AND USER-EXTENSIBLE HEAP DUMP ANALYSIS TOOL

FIELD OF THE INVENTION

The present invention relates to computer systems and more particularly to an architecture for a scalable and a user extensible heap analysis tool.

BACKGROUND OF THE INVENTION

During execution of a computer program, objects are allocated memory to store information. In many environments, memory management routines are provided to enable programmers to dynamically allocate and deallocate memory for objects during the execution of the program. The area of memory from which objects are dynamically allocated and reallocated is often referred to as a "heap." In some run-time environments, e.g. in a JAVA™ virtual machine, the memory management routines also provide for garbage collection, which automatically reclaims memory for objects that are no longer used, so that the reclaimed memory is available for subsequently allocating other objects.

Generally, a garbage collector determines whether an object is no longer used and can therefore recycle the object's memory when the object is no longer referenced within the program. However, some user programs in garbage-collected, run-time environments unintentionally keep references to objects that are no longer going to used in the program, thereby consuming large amounts of memory because keeping a reference to an object prevents the garbage collector from identifying the object as garbage and reclaiming that object's memory. If the program eventually requests to use more memory from the heap than what is available, the program runs out of memory, typically crashing or otherwise failing to perform its intended function.

Debugging the application programming errors that lead to running out of heap memory is a difficult process. Typically, such debugging involves analyzing which objects reference which other objects. Conventional techniques, however, for analyzing the referencing relationships of user-created objects to determine why programs run out of memory are cumbersome and slow. One approach to analyzing these relationships is by running a tool in the virtual machine itself that would analyze the heap in the virtual machine and provide a digest of the memory allocation, e.g. how much memory is retained by which objects, but often these digests can be so large that it is difficult for a developer to manually wade through. In particular, developers may have complicated data structures but previous tools provide limited means for accessing and printing out information concerning the objects in the heap.

Therefore, there is a need for method for analyzing a heap for memory errors, particularly that assists developers in understanding the structure and relationships of objects found in a heap that was dumped in low-memory situations.

SUMMARY OF THE INVENTION

These and other needs are addressed by a heap analyzer tool that processes a snapshot of the heap that had been dumped in low-memory situations. The heap analyzer tool can be configured to relocate the pointers in the dumped heap and allow developers to examine the heap in web browser by presenting markup for displaying a heap object in the browser and rendering pointers in the object as clickable links. When a link is selected, the pointer is followed to another object and markup is generated for rendering that object with its links. Furthermore, callbacks may be provided through an application programming interface (API) to allow developers to furnish their own code for analyzing and displaying their data structures.

One aspect of the present invention relates to a method and software for analyzing a heap that had been dumped in a dump file containing an image of objects that have been dynamically allocated by a process executing in a run-time environment. Pointers in the heap are relocated, and when an object stored in the dump is accessed, a callback having an implementation provided for rendering the object is invoked, and the rendered object is displayed.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for a heap analysis architecture are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Memory Model

One embodiment of the present invention is illustrated with respect to a memory model that is implemented for a multi-user run-time environment. Accordingly, a detailed description of the memory model for this working example is provided, but the present invention is not limited to this example nor to the use of this specific memory model but can be profitably used with other memory models.

Figure 1:
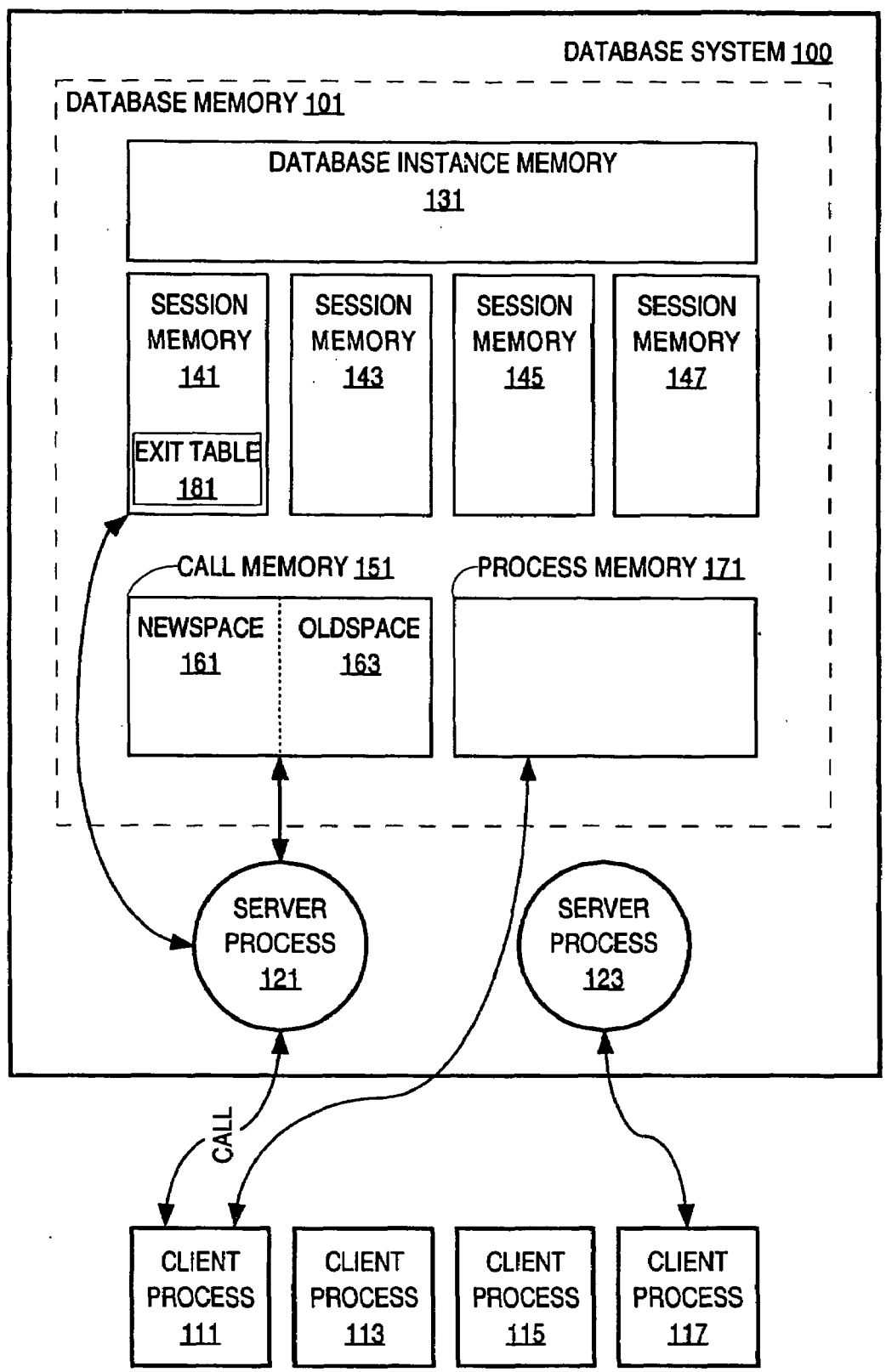
FIG. 1 schematically illustrates a memory model of a multi-user system with which a run-time environment may be used.

FIG. 1 schematically illustrates a multi-user database system 100 with which a run-time environment for a language such as the JAVA™ programming language may be used, although the present invention is not limited to multi-user database systems in particular and may be applied to other multi-user systems. In the illustrated configuration, client processes 111, 113, 115, and 117 establish database sessions with the database system 100. A database session refers to the establishment of a connection between a client and a database system through which a series a calls may be made. As long as the client remains connected in the database session, the client and the associated database session are referred to as being active. Active clients can submit calls to the database system 100 to request the database system 100 to perform tasks. One example of a call is a query in accordance with the Structured Query Language (SQL), and another example is a method invocation of a JAVA™ programming language object or class, defined for performing a database task for database system 100.

Database system 100 comprises, among other components, a database memory 101 for storing information useful for processing calls and a number of server processes 121 and 123 for handling individual calls. The database memory 101 includes various memory areas used to store data used by server processes 121 and 123. These memory areas include a database instance memory 131, session memories 141, 143, 145, and 147, call memory 151, and a process memory 171. It is to be understood that the number of the session memories, call memories, and process memories in FIG. 1 is merely illustrative and, in fact, the number of such memories will vary over time as various clients make various calls to the database system 100.

The database instance memory 131 is a shared memory area for storing data that is shared concurrently by more than one process. For example, shared memory area may be used store the read-only data and instructions (e.g., bytecodes of JAVA™ programming language classes) that are executed by the server processes 121 and 123. The database instance memory 131 is typically allocated and initialized at boot time of the database system 100, before clients connect to the database system 100.

When a database session is created, an area of the database memory 101 is allocated to store information for the database session. As illustrated in FIG. 1, session memories 141, 143, 145, and 147 have been allocated for clients 111, 113, 115, and 117, respectively, for each of which a separate database session has been created. Session memories 141, 143, 145, and 147 are a shared memory used to store static data, i.e., data associated with a user that is preserved for the duration of a series of calls, especially between calls issued by a client during a single database session. JAVA™ programming language static class variables are one example of such static data.

A call memory, such as call memory 151, is used to store data that is bounded by the lifetime of a call. A database call may include execution of a query or other kind of Structured Query Language (SQL) statements or a group of such statements within a database transaction. When client 111 submits a call to the database system 200, one of server processes 121 or 123 is assigned to process the call. For the duration of the call, the server process is allocated a call memory for storing data and other information for use in processing the call. For example, server process 121 uses call memory 151 and session memory 141 for processing a call submitted by client process 111.

An exit table 181 can be provided to keep track of those references within session memory 141 that refer to locations in call memory 151. The exit table 181 is updated when an assignment operation places a reference to a call memory object in a object living session memory. Maintenance of an exit table is described in greater detail in the co-pending, commonly assigned, U.S. patent application Ser. No. 10/339,707 entitled WRITE BARRIER HANDLING IN A MEMORY MANAGEMENT SYSTEM filed on Jan. 9, 2003 by Sexton et al., the contents of which are hereby incorporated by reference in their entirety herein.

At any given time, a server process (e.g., processes 121, 123) is assigned to process a call submitted by a single client (e.g., clients 111, 113, 115, 117). After the server process completes its processing of a call from one client, the server process is free to be assigned to respond to the call of another client. Thus, over a period of time, a server process may be assigned to process calls from multiple clients, and a client may use multiple server processes to handles its various calls. The number of calls requiring execution by a server process is typically much fewer than the current number of active clients. Thus, database system 200 is typically configured to execute fewer server processes than the maximum number of active clients.

Process memory 171 is an area of memory that has the duration of a process and can be used to hold the virtual machine state of the process that is not user-specific. In one embodiment, use of the process memory 171 can be selectively available for specific processes. For example, process memory 171 may be available only for those processes that are started in a specific way, and sessions may be attached to such processes only they are intended to run the specific applications (e.g. an application server) that make use of the process memory 171 feature.

Since session memory is allocated for each active client session, user scalability is improved by reducing the memory requirements of session memory 141. The memory requirements for session memory 141 are reduced by keeping some long-living objects in call memory 151 and recreating the objects in call memory 151 before they are used in a subsequent call.

U.S. Pat. No. 6,564,223 entitled METHOD AND ARTICLE FOR MANAGING REFERENCES TO EXTERNAL OBJECTS IN A RUN-TIME ENVIRONMENT in re Sexton et al. describes a mechanism for keeping long-living objects in call memory 151 by deferring the allocation of objects in call memory 151 until those external objects are actually accessed. This and similar approaches employ lazy evaluation for resolving external objects, and by creating external numeric references to the external objects, such that when the external numeric reference is dereferenced.

In accordance with such an approach for the lazy evaluation of external references, a stub object for the external object is created in session memory 141. The stub object includes a "descriptor," which is a group of data that identifies the external object and is sufficient to create or recreate the external object. Typically, the descriptor is a string that names to the object or includes directions for loading and initializing the external object, for example, from an identified file in secondary storage. Furthermore, the stub object is associated with a "realize routine," which can be a static member function or a generic function for the stub object's class. The realize routine is responsible for creating or recreating the external object using the information encoded in the descriptor. The implementation of the realize routine and descriptor is dependent on the particular external object and is generally written specifically for that external object or for external objects belonging to a particular class.

When a pointer to the stub object is assigned to a slot in an object, for example during initialization of the object, a run-time external reference is generated based on the pointer to the stub object and stored in the slot instead of the pointer to the stub object. A run-time external numeric reference is a reference to an external object, such that dereferencing the run-time external numeric reference causes the external object to be loaded into virtual memory, if the external object is not currently loaded. In this embodiment, the run-time external reference is implemented as a tagged numeric reference, in which the tag bits indicate that the numeric reference is an external numeric reference and other the non-tag bits of the external reference indicates an index into a descriptor array and a value array. The value array stores pointers to objects in call memory 151 that have been activated; if the entry in the value array corresponding the index is null, then the corresponding descriptor, found by indexing the descriptor array, is used to activate the object in call memory 151 and the address of the activated object is cached in the value array. Accordingly, in this approach, long-living objects are recreated in call memory 151 as when the external numeric reference is dereferenced.

Dumping a Heap

Figure 2:
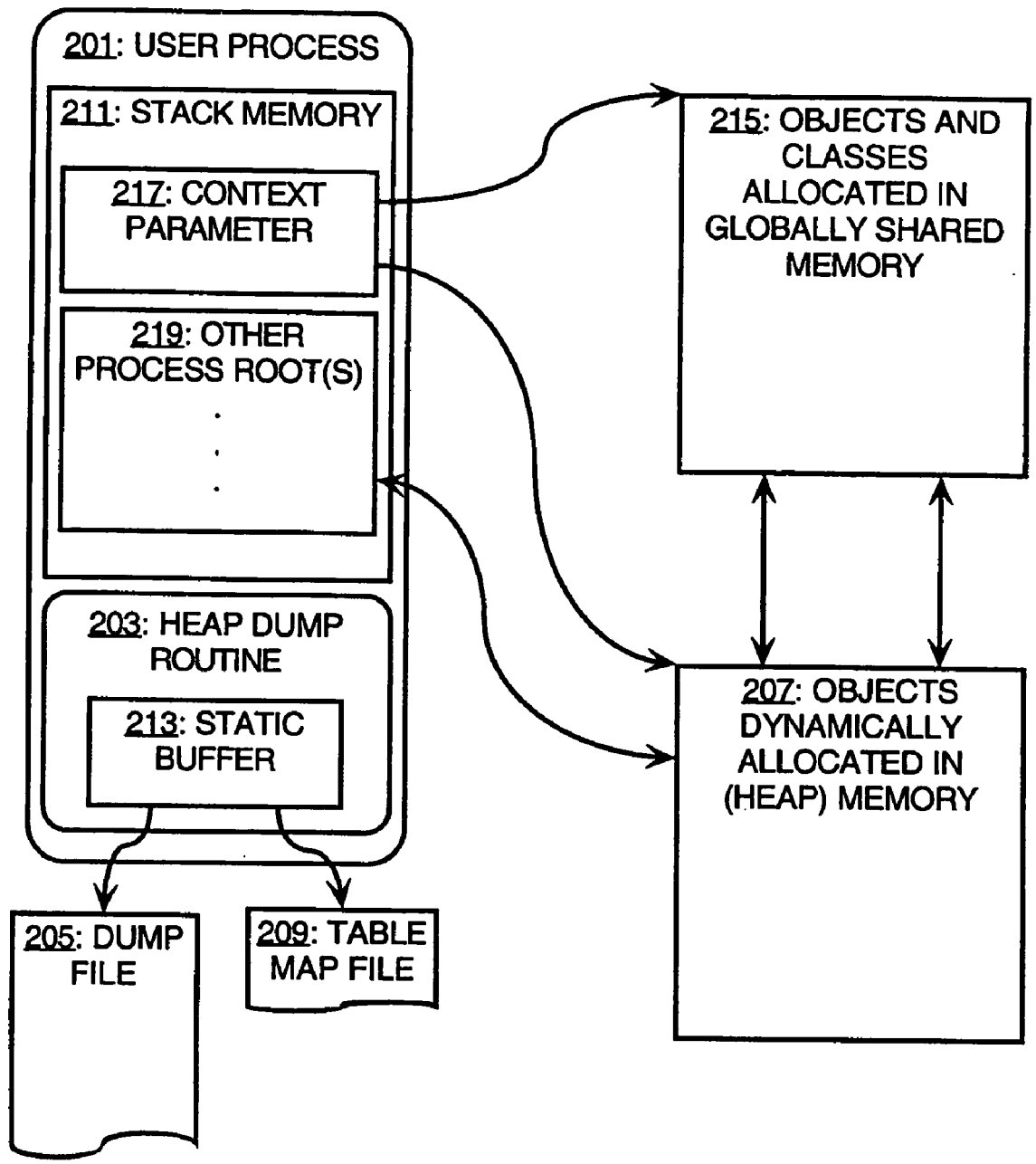
FIG. 2 is a high-level block diagram of a user process and objects allocated on a heap.

One aspect of the present invention is directed to a technique for dumping a heap that is useful even in low-memory situations. In accordance with one embodiment illustrated in FIG. 2, a user process 201 being debugged has been linked with a heap dumping routine 203, which is executed for writing out the objects and classes of the user process 201 into a dump file 205 stored in a persistent storage. The heap dumping routine 203 may be called directly in the execution of the user process 201 or initiated through a debugger in a debugging session.

To reduce memory demands in analyzing the heap of a program that ran low on memory, the heap dumping routine 203 preferably writes the image of those objects 209 dynamically allocated by the user process 201 into the dump file 205 without resorting to a verbose format. For example, the image written to the dump file 205 can be a bit-for-bit copy of the objects 209, or, in other embodiments, some canonicalized form of the object with the same size (e.g. converting the byte-order of the objects to a standard endianness). Use of an object representation that has the same size of the objects 207 does not place a multiplier effect on the memory requirements in the dump file 205, in contrast with verbose formats that include type information or other metadata to describe each of the dumped objects and their components.

In some cases, it is not necessary for the relative positions of objects 209 with regard to each other in raw memory be identical to the relative positions of the objects stored in the dump file 205. For example, some of the objects 209 may be garbage or the user process 203 may be executed in an environment in which the objects are not necessarily contiguous with each other or be allocated on pages that are not necessary contiguous. In such a situation, preserving the relative positions of the objects 209 in the dump file 205 would require reserving as padding over the garbage or between the non-contiguous portions. It may be therefore advantageous to save disk space by writing objects in the dump file 205 at different relative offsets. However, when objects are at different relative offsets, it is important to eventually update the pointers and other references to the objects to point to the new, relocated addresses of the objects.

Accordingly, the relocation information can be preserved in persistent storage so that the objects can be relocated at a later time. In one implementation, the heap dumping routine 203 also writes out a table map file 209 that associates the offsets of objects dumped in the dump file 205 with addresses of the objects 207 in raw memory. For example, an object allocated at virtual address 0x12345678 in raw memory may have been dumped into the dump file 205 at file offset 0x001000000. This information can be captured in the table map file 209 by storing the virtual address 0x12345678 and offset 0x001000000 in the dump file 205 in association with one another (e.g. by juxtaposition). Since the relocation information is preserved in the table map file 209, the heap dumping routine 203 need not consume additional memory for relocating the objects by itself, thereby enabling the heap dumping routine 203 to execute without needing to allocate memory dynamically, using only static memory such as a stack 211 and a static buffer 213 (which can even be allocated on the stack 211).

In addition to dumping the objects that have been dynamically allocated by the user program 201, it is useful to also dump the objects, classes, and static class variables 215 in a globally shared memory (such as database instance memory 131) because memory held by static class variables is a common source of out-of-memory problems. For example, an application developer may wonder why a particular class has 400 MB of allocated memory held by a static class variable of the class. On the other hand, some shared data, such as the byte codes for methods, is not interesting to the application developer in debugging memory consumption problems, because the memory consumed by such data is shared and/or fixed and is not responsible for why the user process 201 ran out of memory. This shared information need not be written out into the dump file 205. Thus, many pointers to such data, which are typically found in external references, can simply be zeroed, but those external references that go between the shared part 213 of the class back to the objects 207 in the session private part of the class are maintained because they do point to memory used by the user process 201 that contributes to running out of memory.

Generally, however, all live objects in the user space (e.g. objects that are private to the user process 201) are preferably dumped into the dump file 205. Objects in user space may include those objects in call memory 151, newspace 161, oldspace 163, and stack memory 211. In accordance with a multiple-virtual machine implementation such as that described in the commonly assigned and co-pending U.S. patent application Ser. No. 09/512,620, entitled USING A VIRTUAL MACHINE INSTANCE AS THE BASIC UNIT OF USER EXECUTION IN A SERVER ENVIRONMENT, filed on Feb. 25, 2000 by Harlan Sexton et al., the stack memory 211 may also contain a context parameter 217 that specifies the virtual machine instance employed by the user process 201, from which the roots of the garbage collector can be found. The roots of the garbage collector are those references whose logical closure includes all the entities considered live in the user process 201, such as objects and classes allocated in globally shared memory 215 and/or objects dynamically allocated in heap memory 207. In addition, the stack memory 211 may also include other process roots 219 that maintain references to objects, such as object on finalizer stacks. In one implementation, however, conservative roots (words having a bit pattern that looks like a valid reference) need not be followed since developers may find them more confusing than useful.

Figures 3, 4, 5:
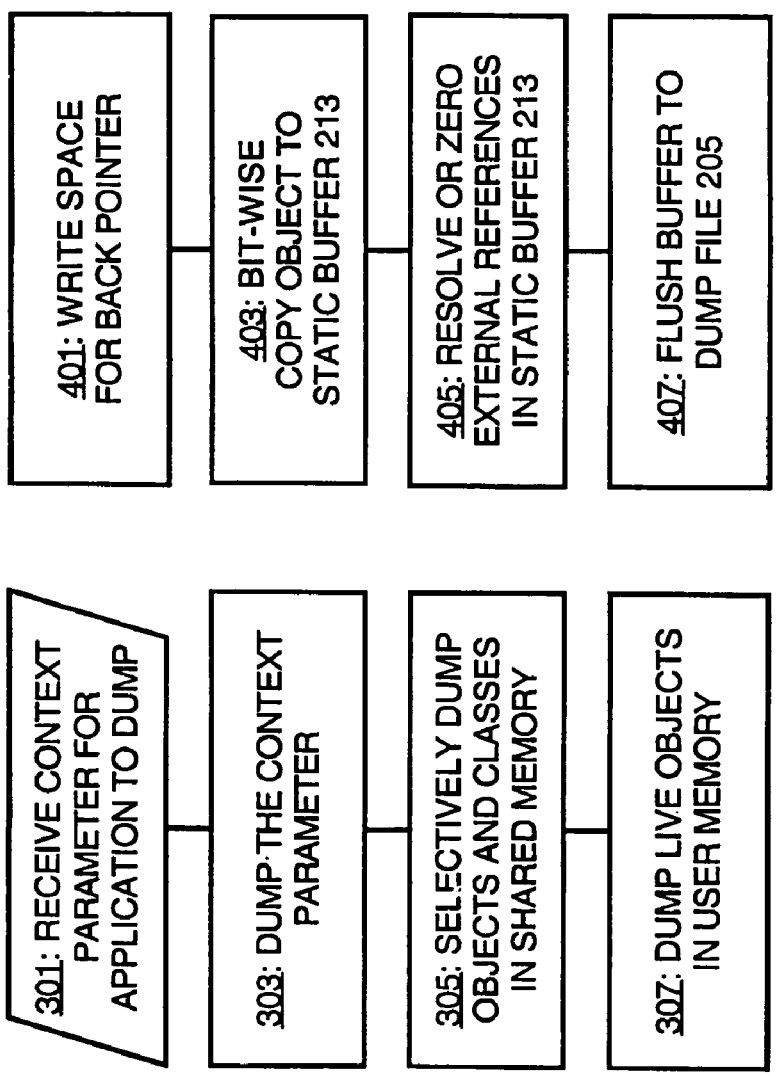
FIG. 3 is a flowchart illustrating a procedure for dumping heap objects in accordance with an embodiment of the present invention.
FIG. 4 is a flowchart illustrating a procedure for dumping and modifying an object in accordance with an embodiment of the present invention.
FIG. 5 is a flowchart illustrating a procedure for analyzing a dumped heap in accordance with an embodiment of the present invention.

Referring to FIG. 3, a flowchart illustrates a procedure for dumping heap objects in accordance with an embodiment of the present invention. At step 301, the heap dumping routine 203 is called with the context parameter 217 that identifies the virtual machine instance whose memory allocation is being debugged. The context parameter 217 includes pointers and other references that eventually reach the roots of the garbage collector. At step 303, the context parameter 217 is dumped into the dump file 205. Because much the information in the context parameter 217 is meaningless to developers debugging user application, in one embodiment, a pseudo-object is constructed that holds the references to the relevant objects, including those that serve as roots for the garbage collector and a vector of objects on finalizer stacks, because if the user process 201 is hanging onto a lot of memory, then the memory hung onto should be reachable by the garbage collector from one or more of those objects.

At step 305, objects and classes in shared memory 215 are selectively dumped into the dump file 205. In one embodiment, references to the shared memory are followed in a recursive, depth-first manner to avoid dumping everything the shared space. In particular, byte-codes and methods are not copied into the dump file 205. One advantage for dumping the shared objects and classes early in the dump file 205 is that it makes the processing of the dump file easier. For example, it is easier to have all the class information, which includes all the necessary format information, to appear in dump file 205 before the instances of the class.

At step 307, the live objects in the user space 207, 211 are dumped, including those allocated on the heap 207 and those on the stack 211. In one implementation, this can be accomplished by calling routines in the garbage collector for visiting, scanning, and dumping live objects into the dump file 205. Dead objects or garbage, on the other hand, are not visited and not dumped.

Referring now to FIG. 4, the operation in accordance with one embodiment of the present invention for dumping an object is illustrated. At step 401, each object is preceded by an 8-byte word to facilitate the operation of the heap analysis tool, as explained herein below. The 8-byte word can be of any size sufficient to store a back pointer used by the heap analysis tool, but the heap dumping routine 203 need only reserve space for that back pointer by writing zero bytes for the length of the back pointer into the dump file 205.

At step 403, the object itself is dumped, starting by copying the object bit-by-bit into the static buffer 213. In most cases, the object is ready to be written to the dump file 205, but in a preferred embodiment, external references are first resolved or removed before being written to the dump file 205. For example, external references to entities that need not be dumped such as bytecodes can be zeroed out without loss of functionality in debugging the developer's errors in using memory. Also, since application developers are not familiar with how external references are resolved, especially for those external references from a shared class variable to private data, external references are replaced by the pointer to the private data. In this embodiment, therefore, external references are modified in the static buffer 213 (step 405) before the static buffer 213 is flushed to disk (step 407) to be part of the dump file 205. Another modification is to remove from references embedded pointer tags and other run-time information not relevant to developers. Modifying the object in this manner in the static buffer 213 advantageously allows for the object to be processed for use by a heap analysis tool, without requiring additional memory and without modifying the live object on the heap so that execution of the user process 201 can be continued, perhaps even to a point at which another snapshot of the heap can be dumped.

Heap Analysis

Figure 6:
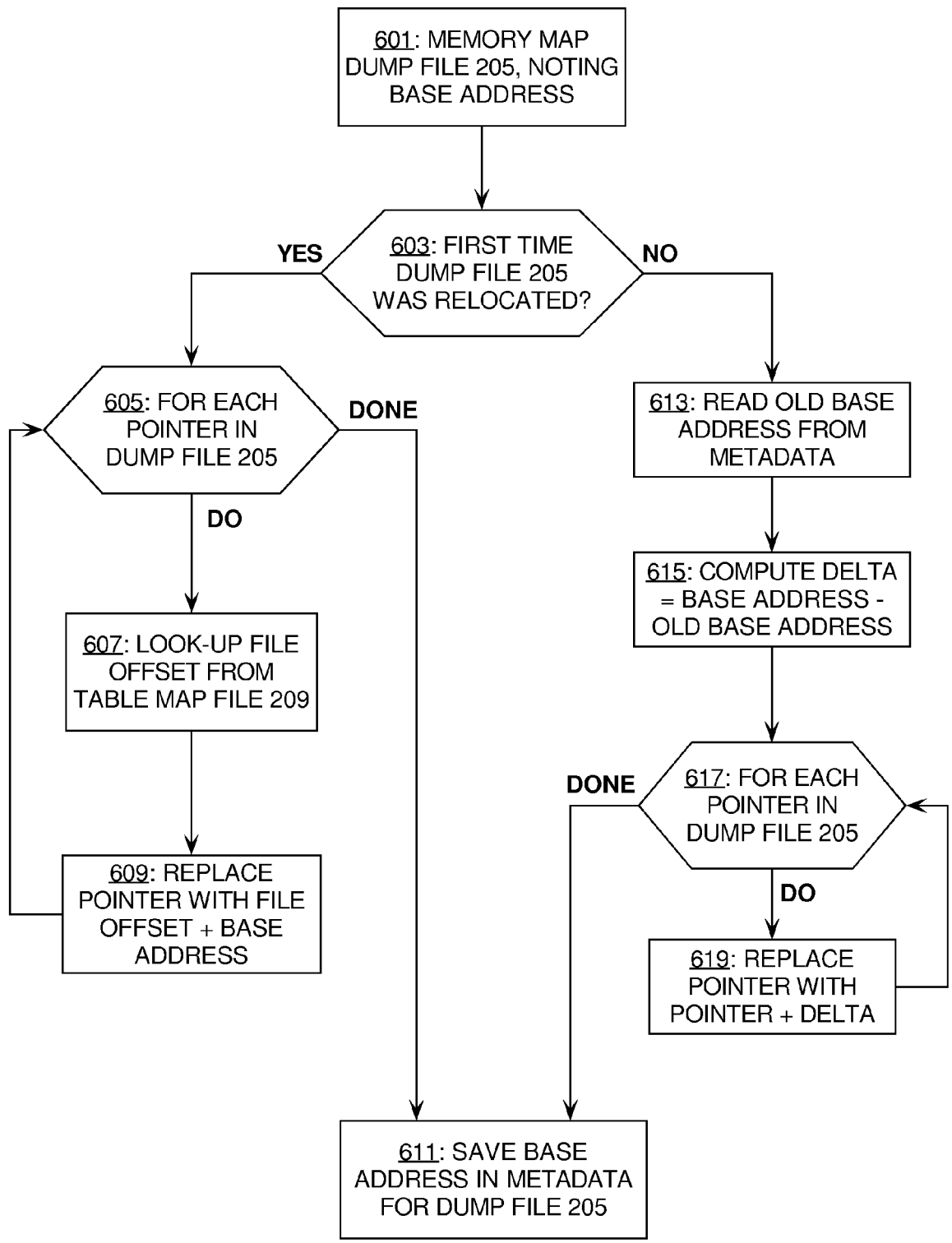
FIG. 6 is a flowchart depicting one procedure for relocating objects in a heap.

Referring now to FIG. 5, the operation of a heap analysis tool in accordance with one embodiment of the present invention is illustrated. At step 501, on the first time the heap analysis tool is invoked on a dump file, the references in the dumped heap are relocated. One implementation in depicted in FIG. 6, in which the dump file 205 is memory-mapped (step 601), for example, by making an operating system call that load the dump file 205 into an address space accessible by the heap analysis tools and returns a base address in that address space. At step 603, metadata for the dump file 205 is inspected to determined if the dump file 205 had been relocated before.

If this is the first time the dump file 205 had been relocated, then a pass is made over the dump file 205, scanning the objects for pointers (step 605), for example, by using the scanning code of the garbage collector. Each pointer is extracted and looked up in the table map file 209, which associates pointer addresses of the dumped process with offsets of objects in the memory-mapped dump file 205 (step 607). In one embodiment, the table map file 209 is memory-mapped, too and hash tables are built from the information in the table map file 209 to quickly look up the file offsets of objects based on the values of the pointers. Then, in step 609, the pointer is relocated by replacing the virtual machine address originally recorded in the dump file 205 with the offset of the referenced object in the memory-mapped dump file 205, which can be found at the base address plus the dump file 205 offset. If an object contains a reference to an object that is not dumped in the dump file 205 or an unprocessed external reference, that reference is zeroed.

The changes to the dump file 205 during for relocation can be saved, for example by writing the dump file 205 back to storage and recording the base address in metadata associated with the dump file 205 (step 611). Accordingly, an subsequent invocation of the heap analysis tool on the dump file 205 file need not use the table map file 209 to perform this relocation again. For example, the dump file 205 can be relocated by fetching the old base address from metadata (step 613), computing a delta as a difference between the old base address and the new base address (step 615), and, for each pointer in the dump file 205 (step 215), adding the delta to the pointer (step 619).

In step 503, a depth-first graph walk of the object state in the dump file 205, starting from the root object, which include the Java stack, Java class static variables, objects awaiting finalization, and Java Native Interface (JNI) references. The depth-first walk allows strong references, which are visible to and maintained by the garbage collector, to a given object be found, and to compute a quantity which we refer to as the object's weight. The weight of an object acts as a estimate of size in bytes of the memory that would be garbage collected if we removed all references to that object. The weight of an object can be defined, in one implementation, to be the sum of size in bytes of the object plus the size of all of the objects below that object in the depth-first walk. If the graph of objects in the snapshot is a tree, in which each object has exactly one referencing object, then the weight is an accurate estimate. However, if an object A is subtended by some object that has additional links to objects seen prior to A in the tree walk then the weight may be larger, and perhaps much larger, than the amount of memory reclaimed by garbage collecting A. Accordingly, the weight informs the developer that a particular object is a good candidate for the cause of holding on to so much memory.

To assist in calculating the weight of objects, an auxiliary node is constructed for each object, and a pointer back to this node is recorded so that an estimate of the size of the state that is implicated by each object can be computed. In one implementation, space for the back pointers has already been reserved in the dump file with the 8-byte prefix, but in other implementations ancillary data structures such as another hash table can be used to store this information.

Figure 7:
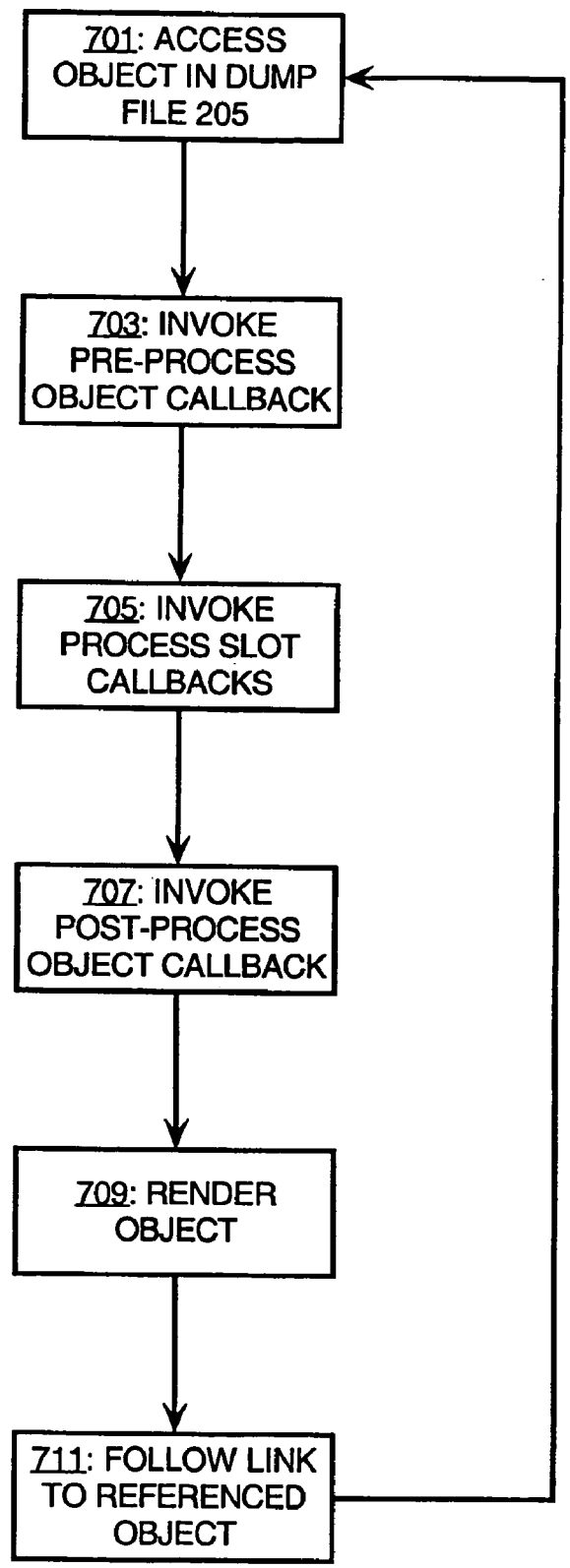
FIG. 7 is a flowchart illustrating how user-provided callbacks are invoked on an object to be rendered.

After this processing is complete, the heap analysis tool becomes a simple web server in step 505, allowing users to browse the dumped state. Specifically, both the context parameter 217 and root objects 219 are initially displayed on a browser operated by a user along with links representing pointers to objects. Referring to FIG. 7, one of the links is visited, the pointer in the heap is dereferenced to access the object (step 701). Callbacks may be provided to allow developers execute their own code to analyze and render their objects to an object. In one embodiment, a callback is invoked for preprocessing a object (step 703), then callbacks are invoked for each slot in the object (step 705), and finally a post-processing object call back is invoked (step 707). At step 709, the heap analysis tool renders at least some of that object (e.g. if the object is very large, only about the first 500 slots need be displayed) in a newly generated web page viewable in the user's browser, using, for example, mark up generated by invoking the call backs. If a slot contains reference to another object, that slot is displayed as a clickable link, which will bring up another web page when activated (step 711).

Figure 8:
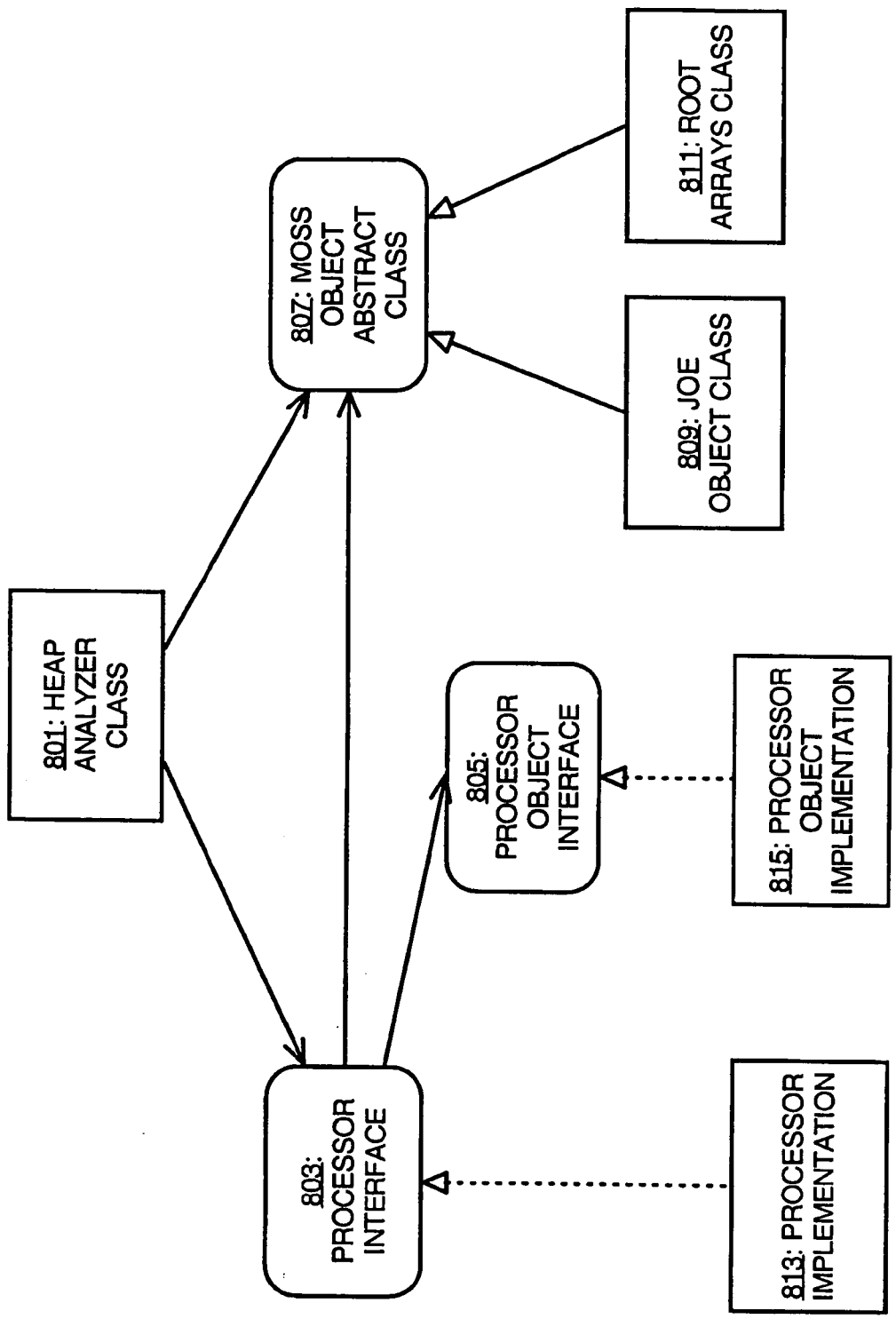
FIG. 8 is an entity diagram of one way to permit a developer to furnish the user-provided callbacks.

FIG. 8 shows an entity diagram illustrating how a developer can furnish callbacks to the heap analysis tool. In particular, a Heap Analyzer class 801 may be configured to use a processor defined by a Processor interface 803, which returns an Object Processor defined by an Object Processor interface 807 suitable for processing an instance of a MOSS (Meta Object System) Object abstract class 805. Instances of the MOSS Object abstract class 805 can be instances of a Joe Object class 809 (e.g. Java objects allowed in heap memory 207) or a Roots Array class 811 (encapsulating, e.g., the process roots 219). In this architecture, a developer provides a Processor implementation 813 and Object Processor implementations 815 that define what are invoked by the callbacks.

Returning back to FIG. 5, in step 507, when the links from an object are displayed, the value of the weight of a link divided by the weight of the object is displayed as a percentage, particularly if the percentage exceeds a predetermined threshold such as is 10% or more. This display helps developers to find the weightiest objects.

Accordingly, the developer is empowered to browse the application program's heap, which can be invaluable in understanding why the heap grows. Generating web pages upon request advantageously allows for very large heaps to be displayed while still allowing the developer to see all of the relevant information. Providing a callback framework further enables a developer to render and analyze a heap that has been dumped in a low memory situation.

Hardware Overview

Figure 9:
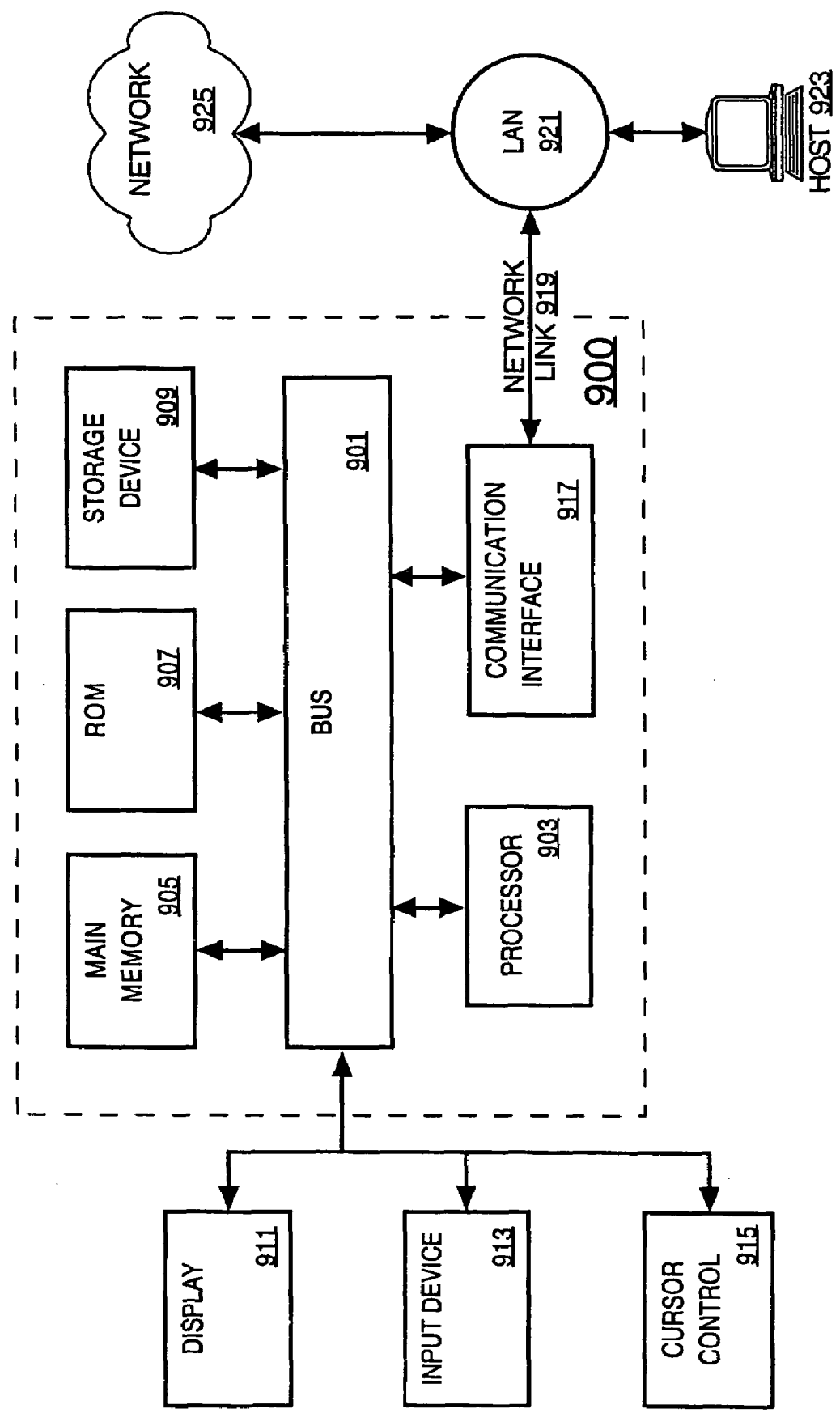
FIG. 9 depicts a computer system that can be used to implement an embodiment of the present invention.

FIG. 9 illustrates a computer system 900 upon which an embodiment according to the present invention can be implemented. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to one embodiment of the invention, heap analysis is provided by the computer system 900 in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the present invention through the network 925, the local network 921 and the communication interface 917. The processor 903 may execute the transmitted code while being received and/or store the code in the storage device 909, or other nonvolatile storage for later execution. In this manner, the computer system 900 may obtain application code in the form of a carrier wave.

The term "computer-readable medium" as used herein refers to any medium that participates in providing instructions to the processor 905 for execution. Such a medium may take many forms, including but not limited to nonvolatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

CONCLUSION

While the present invention has been described in connection with a number of embodiments and implementations, the present invention is not so limited but covers various obvious modifications and equivalent arrangements, which fall within the purview of the appended claims.

What is claimed is:

1. A method for analyzing a heap, comprising:
receiving, from a user, input that specifies a callback routine;
storing data that identifies the callback routine specified by the user;
loading a dump file into volatile memory, wherein the dump file contains an image of objects that have been dynamically allocated by a process executing in a run-time environment;
in response to user input, while the dump file is loaded into the volatile memory, inspecting the data to identify the callback routine specified by the user;
issuing a callback to the callback routine to cause the callback routine to perform at least one of:
generating a visual display that represents at least a part of an object stored in the image contained in the dump file, or
traversing links between objects stored in the image contained in the dump file.

2. A method according to claim 1, further comprising replacing a plurality of pointers stored in the dump file, wherein replacing the plurality of pointers includes, for each pointer of the plurality of pointers:

using the value of said each pointer to look up an offset in the dump file, wherein the offset is stored in association with the value of said each pointer, and replacing, based on the offset, said each pointer with a particular value;

wherein the offset associated with each pointer in the plurality of pointers is different than the offset associated with each other pointer of the plurality of pointers.

3. A method according to claim 2, further comprising:

memory mapping the dump file at a base address in an address space;

wherein the particular value includes a sum of the offset and the base address.

4. A computer-readable medium bearing instructions for analyzing a heap, wherein the computer-readable medium is one of a volatile medium or a non-volatile medium, said instructions being arranged, when executed by one or more processors, to perform the method according to claim 3.

5. A method according to claim 2, wherein using the value of said each pointer to look up an offset includes:

accessing a data structure containing an association of the offset and the value of said each pointer, wherein the data structure has been populated from a map file storing the association.

6. A computer-readable medium bearing instructions for analyzing a heap, wherein the computer-readable medium is one of a volatile medium or a non-volatile medium, said instructions being arranged, when executed by one or more processors, to perform the method according to claim 5.

7. A computer-readable medium bearing instructions for analyzing a heap, wherein the computer-readable medium is one of a volatile medium or a non-volatile medium, said instructions being arranged, when executed by one or more processors, to perform the method according to claim 2.

8. A method according to claim 1, further comprising:

displaying a link to the object; and in response to visiting a linking, performing the steps of accessing the object and displaying the object.

9. A computer-readable medium bearing instructions for analyzing a heap, wherein the computer-readable medium is one of a volatile medium or a non-volatile medium, said instructions being arranged, when executed by one or more processors, to perform the method according to claim 8.

10. A method according to claim 1, further comprising:

walking the objects in the dump file to compute respective weights for each of the objects; and displaying one of the respective weights corresponding to the object.

11. A method according to claim 10, wherein the weights correspond to amounts of memory referenced respectively by the objects.

12. A computer-readable medium bearing instructions for analyzing a heap, wherein the computer-readable medium is one of a volatile medium or a non-volatile medium, said instructions being arranged, when executed by one or more processors, to perform the method according to claim 11.

13. A computer-readable medium bearing instructions for analyzing a heap, wherein the computer-readable medium is one of a volatile medium or a non-volatile medium, said instructions being arranged, when executed by one or more processors, to perform the method according to claim 10.

14. A computer-readable medium bearing instructions for analyzing a heap, wherein the computer-readable medium is one of a volatile medium or a non-volatile medium, said instructions being arranged, when executed by one or more processors, to perform the method according to claim 1.

15. The method of claim 1, wherein issuing the callback includes issuing the callback to the callback routine to cause the callback routine to perform generating a visual display that represents:

some, but not all, of the object if the object is greater than a particular size, and all of the object if the object is less than the particular size.

16. A computer-readable medium bearing instructions for analyzing a heap, wherein the computer-readable medium is one of a volatile medium or a non-volatile medium, said instructions being arranged, when executed by one or more processors, to perform the method according to claim 15.

17. The method of claim 1, wherein generating the visual display is performed by generating a webpage viewable in a browser.

18. A computer-readable medium bearing instructions for analyzing a heap, wherein the computer-readable medium is one of a volatile medium or a non-volatile medium, said instructions being arranged, when executed by one or more processors, to perform the method according to claim 17.

19. The method of claim 1, wherein the callback routine generates markup that defines a webpage viewable in a browser.

20. A computer-readable medium bearing instructions for analyzing a heap, wherein the computer-readable medium is one of a volatile medium or a non-volatile medium, said instructions being arranged, when executed by one or more processors, to perform the method according to claim 19.

21. The method of claim 1, wherein:

generating the visual display further includes generating a representation of a slot associated with the object;

the slot corresponds to a reference to a second object; and the method further comprising:

displaying the slot as a clickable link; and in response to receiving user input that selects the clickable link, invoking a second callback routine registered by the user, wherein the second callback routine generates a second webpage that visually represents the second object.

22. A computer-readable medium bearing instructions for analyzing a heap, wherein the computer-readable medium is one of a volatile medium or a non-volatile medium, said instructions being arranged, when executed by one or more processors, to perform the method according to claim 21.

23. The method of claim 1, wherein the user input identifies the callback routine by providing an implementation for a particular class defined in a heap analysis tool.

24. A computer-readable medium bearing instructions for analyzing a heap, wherein the computer-readable medium is one of a volatile medium or a non-volatile medium, said instructions being arranged, when executed by one or more processors, to perform the method according to claim 23.

* * * * *

UNITED STATES PATENT AND TRADEMARK OFFICE
CERTIFICATE OF CORRECTION

PATENT NO. : 7,249,235 B2
APPLICATION NO. : 10/872536
DATED : July 24, 2007
INVENTOR(S) : Harlan Sexton et al.

It is certified that error appears in the above-identified patent and that said Letters Patent is hereby corrected as shown below:

(56) References Cited

Please insert

--2005/0120162    6/2005    Sivaram, R. --

Signed and Sealed this

Twenty-eighth Day of August, 2007

JON W. DUDAS
*Director of the United States Patent and Trademark Office*